United States Patent [19]
Makowski

[11] 3,878,761
[45] Apr. 22, 1975

[54] CURVE MILLING OR CURVE GRINDING MACHINES

[75] Inventor: Max Makowski, Gavelsberg, Germany

[73] Assignee: Maschinenfabrik Alfred Schmermund, Gevelsberg, Germany

[22] Filed: Nov. 19, 1973

[21] Appl. No.: 417,325

Related U.S. Application Data

[63] Continuation of Ser. No. 231,102, March 2, 1972, abandoned.

[30] Foreign Application Priority Data
Mar. 3, 1971 Germany.............................. 2110109

[52] U.S. Cl............. 90/13.9; 51/100 R; 51/165.79; 318/39; 318/571; 318/578; 318/696
[51] Int. Cl...................... B23q 35/08; G05b 11/01
[58] Field of Search ............ 318/39, 571, 578, 696; 90/13.9; 51/100 R, 165.79, 165.89; 310/49

[56] References Cited
UNITED STATES PATENTS

| | | | |
|---|---|---|---|
| 2,945,997 | 7/1960 | Kennedy............................ | 310/49 X |
| 3,437,007 | 4/1969 | Schmermund...................... | 90/13.9 |
| 3,601,005 | 8/1971 | McKusick......................... | 51/100 R |

*Primary Examiner*—Andrew R. Juhasz
*Attorney, Agent, or Firm*—Sughrue, Rothwell, Mion, Zinn & Macpeak

[57] ABSTRACT

A milling or grinding machine is disclosed wherein a tool is displaced relative to a rotatable workpiece in accordance with a series of values stored on a master template. The profile of the master template is sensed by a sensing means which is so coupled to means supporting the tool as to impart displacement to the latter in accordance with displacement of the sensing means produced by sliding displacement of the master template. The means for displacing the master template includes an electrical stepping motor which is responsive to output pulses derived from a frequency divider network, of which the input is connected to a pulse generator. The pulse generator is so coupled to means for rotating the workpiece as to provide a plurality of pulses for each predetermined angular displacement of the workpiece. The frequency divider network includes a plurality of successively connected frequency divider devices, each of which is manually settable to provide output pulses equal in number to the number of pulses applied to the input of the selected frequency divider device divided by the divider ratio to which the selected divider device is set. By adjusting the divider ratios set at the respective divider devices, the angular displacement of the workpiece is correlated with the displacement of the master template in a predetermined manner.

7 Claims, 1 Drawing Figure

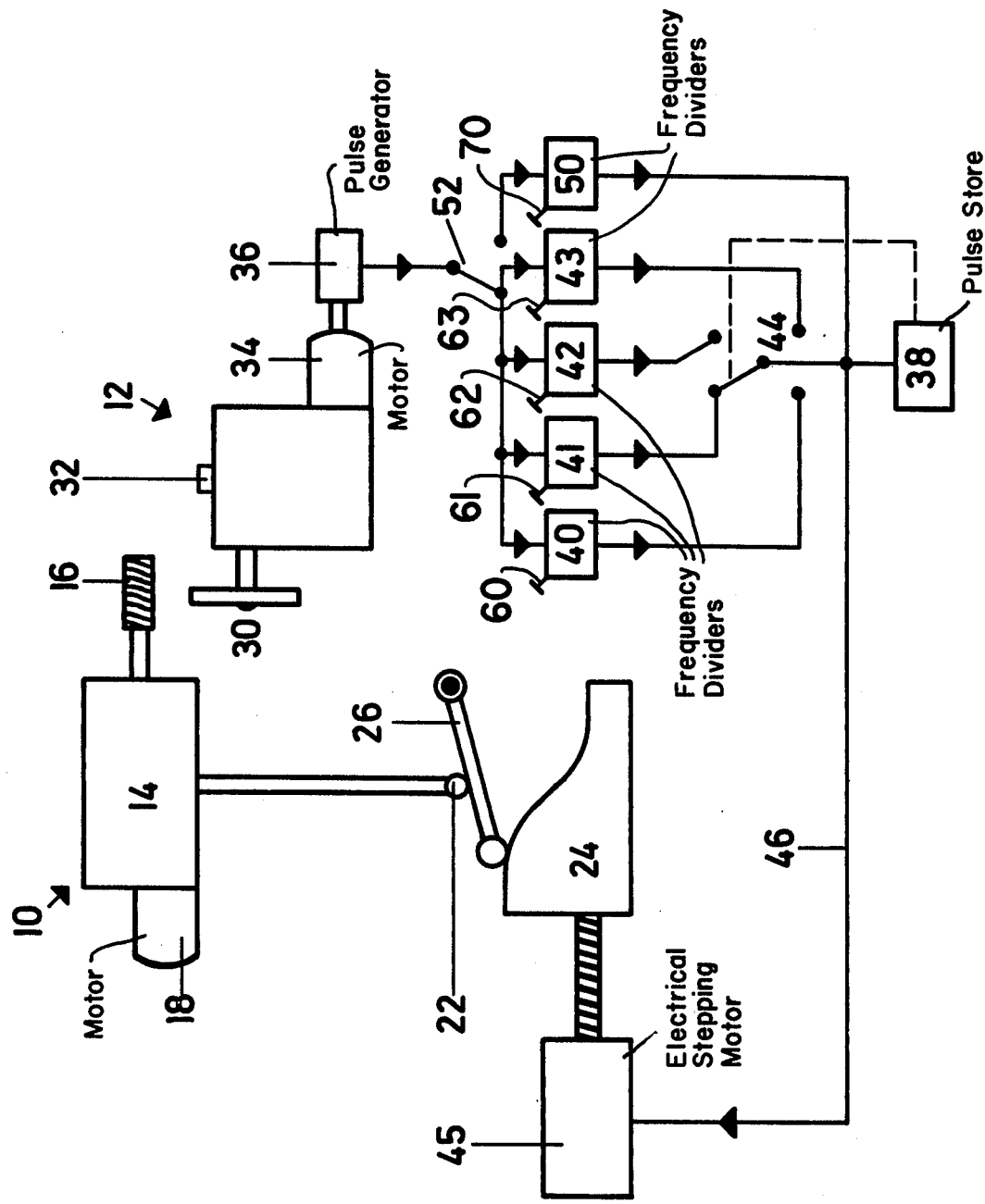

3,878,761

CURVE MILLING OR CURVE GRINDING MACHINES

This is a Continuation, of application Ser. No. 231,102, filed Mar. 2, 1972 and abandoned upon the filing of this application.

BACKGROUND OF THE INVENTION

The present invention relates to curve milling or curve grinding machines.

On machines of this kind, cam discs or cam cylinders are manufactured which have a curved surface conforming to a predetermined law. This conformity of the curve will be briefly designated as "the law of the curve". In some applications, the circumferencial surface of a cam disc cylinder may describe an archimedean spiral in which the rise and fall of a co-operating cam follower takes place in accordance with the so-called "trapezium of acceleration".

Such machines have a workpiece spindle, on which the workpiece is firmly clamped and which is slowly rotated by a drive motor while the workpiece is machined by a suitable tool. The tool, such as a milling or grinding tool, is carried by a tool support, which is displaced in dependence upon the law of the curve to be machined on the rotating workpiece, while the workpiece spindle rotates about a fixed axis. The tool support is displaced relative to the axis of the workpiece spindle in dependence upon the displacement relationship predetermined by the law of the curve. Thus, each variation of the position of the workpiece due to the rotation of the workpiece spindle must be accompanied by an associated displacement of the tool support; when the desired curve in a definite region, the so-called "dwell", has a constant radius, then the displacement of the tool during this period is, of course, zero.

It is known to store the mutually associated values corresponding to the angular displacement of the workpiece and to the displacement or stroke of the tool for a particular curved surface to be formed on the workpiece on a punched tape, or on a magnetic drum or other similar means and to let the angular displacement of the spindle and the linear stroke displacement of the tool take place in accordance with such stored data. This procedure is known as the so-called "path control". The numerical storage values are in this case converted into analogue values to interpolate between consecutive predetermined angular dispositions of the spindle and consecutive predetermined locations of the tool support.

It is known that a single master template may be utilized to control the displacement of the tool support in a machine tool when curved surfaces are to be produced on respective workpieces which differ from each other only in scale. In such a known machine, the displacement of the master template takes place in proportion to angular displacement of the workpiece spindle in an analogue fashion and the transmission of the requisite corresponding displacement to the tool support, which displacement is determined by the shape of the master template, also takes place in an analogue fashion. The stroke scale factor is set by a linkage effective in the scanning of the master template, while the angle scale factors are embodied by different time control curves. This machine requires for each curve law only a single master template, which in each case according to the angular extent of the individual fall and rise sections as well as dwell section of the curve to be produced are moved by different time control curves, which however are substantially simpler to manufacture than the master template.

It is an object of the present invention to provide a machine for milling or grinding curved camming profiles, wherein the afore-mentioned time control curves can be omitted and the annular extent of the "rise", the "fall", and the "upper" and "lower dwell" (or the other curve sections in the case of a different curve law) are numerically selectable in simple manner, while utilizing only a single master template for each curve law, to control displacement of the tool support.

SUMMARY OF THE INVENTION

According to the present invention there is provided a shaping machine comprising tool support means displaceably mounted on a frame of the machine, rotatable workpiece support means, a master template displaceably mounted on the frame, first displacement means for rotatably displacing the workpiece support means, second displacement means for displacing the master template relative to sensing means for sensing the profile of the master template, coupling means for inter-coupling the sensing means and the tool support means to impart displacement to the tool support means in response to displacement of the sensing means produced by displacement of the master template, a repetitious signal generator coupled to the first displacement means to generate a predetermined member of repetitious signals on each predetermined angular displacement of the workpiece support means, divider means for providing an output signal on the generation of each of a predeterminable number of the repetitious signals, selectably operable setting means to set the divider means to determine the numerical value of said predeterminable number, and applicator means for applying said output signals to the second displacement means to control the displacement of the master template.

BRIEF DESCRIPTION OF THE DRAWINGS

An embodiment of the invention will now be more particularly described with reference to the single FIGURE of the accompanying drawings which shows a block schematic diagram of an automatically controlled machine tool for grinding or milling a curved surface on a workpiece.

DESCRIPTION OF THE PREFERRED EMBODIMENTS.

The drawing shows tool support means 10 and workpiece support means 12 of a machine tool. The tool support 10 includes a slidable table 14, which is of settable height, to effect the application of a milling tool 16 to a workpiece support 30. In the schematic diagram shown in the drawing, the tool support means 10 is mechanically coupled via a link 22 to sensing means 26 and is vertically displaceable relative to a supporting frame of the machine, which has been omitted from the drawing in the interests of clarity. However, the vertical displacement of the tool support means 10 may be effected by hydraulically, pneumatically or other suitably operated means responsive to the displacement imparted to the sensing means 26 on the displacement of a master template 24. In this case, the displacement means for vertically displacing the tool support means 10 is controlled by a control means (not shown) which is suitably responsive to control signals generated in response to the displacement of the sensing means 26. In the schematic diagram shown in the drawing, the sensing means comprises a pivotally mounted lever 26 which is coupled to the tool support means 10 via the vertically displaceable coupling link 22, which may be displaced along the length of the lever 26 to vary the displacement imparted to the tool support means for a given movement of the sensing means 26. Also mounted on the slidable tool support table is a direct current motor 18, which drives the milling tool 16 at a predetermined rate of rotation via suitable gearing means (not shown).

The shaped profile of the template 24 represents the law of the curve to be milled on a workpiece for example, an acceleration trapezium, in the shape of a normalized feed (which can be varied in scale by adjustment of the link 22 relative to the sensing means 26) distributed over a normalized displacement path, namely the length of the template 24.

By way of example, the operations for milling the circumferential surface of a workpiece to produce a camming surface will now be described.

A first portion of the peripheral surface of the disc workpiece is milled to provide an arcuate surface of constant radius, this portion corresponds to the upper dwell of a follower co-operating with the finished cam. A second portion, the fall portion, is a curved surface predetermined by the shaped profile of the template and is formed by lowering the milling tool 16 until it reaches its lowest position. A third portion, the lower dwell portion, is of constant radius. A fourth portion, the rise portion, is a curved surface formed by raising the milling tool in accordance with the displacements imparted to the sensing means on displacement of the template in a direction opposite to that followed during the formation of the first portion. A family of many different cam discs, each different in two variables, may be milled utilizing the template 84. The individual discs differ in the distance between their upper and lower dwell portions — these are individually set for each cam disc to be produced by pre-setting the coupling ratio between the sensing means 26 and the tool support means 10. The individual discs in the family may also differ in the angular extents of the respective upper dwell, fall, lower dwell and rise portions in each individual disc. The "upper" and "lower" dwell portions are simply portions of constant radius, during the formation of which the sensing means remains stationary at a terminal value given by the template 24. Fall and rise follow in conformity to the law given by the curvature of the template.

For the determination of the angular extents of the respective cam portions, a relationship between the advance of the tempate 24 and the rotation of the workpiece must be predetermined. In the example which has been described, this relationship is individually settable for each of the four portions of the cam disc. In the embodiment of the invention described with reference to the drawing, an "electronic gearing" is provided which is adjustable to predetermine this relationship for each portion.

The workpiece support means comprises at least one spindle on which the workpiece is firmly clamped. In the embodiment shown in the drawing, two mutually perpendicular spindles 30 and 32 are provided to enable curve discs and curve cylinders to be milled or ground. Both these spindles are coupled to a common direct current drive motor 34, via stepdown gearing (not shown in detail).

Connected to the shaft of the drive motor 34 is a repetitious signal generator 36, which for each rotation of the shaft delivers a predetermined number of electrical pulses—for example 2000 pulses—in uniform time sequence, the pulse repetition frequency being dependent on the speed of rotation of the shaft. Although the repetitious signal generator 36 provides electrical output pulses, the generator may comprise mechanical, pneumatic, hydraulic, or optical means for sensing the rotation of the drive motor 34 to initiate the generation of the electrical output pulses. Such sensing means may each be of a kind well known to those skilled in the art, and therefore are not described. The output of the pulse generator 36 is connected to the respective inputs of four frequency dividers 40, 41, 42, and 43, the dividing ratios of which are manually settable by the dials 60, 61, 62, and 63, respectively. A further frequency divider 50, manuably settable by the dial. 70 will be referred to subsequently. A pulse store 38 is connected as shown to the outputs of the frequency dividers 40 to 43. The store 38 is a ring counter, the storage capacity of which has a predetermined value, for example 72,000 pulses.

The store is so connected together with the frequency dividers 40 to 43 that on the store 38 being counted down to zero, the next frequency divider is connected to the store 38 via an electronic switch—symbolically represented by a switch contact 44. The store 38 is counted down to zero four times for each complete curved profiled cam disc to be produced by output pulses appearing at the output of each of the dividers 40 to 43. The dividers 40–43 are connected successively by the switch contact 44 during the formation of the four portions of the cam profile described, the switch contact 44 being displaced in response to control signals derived in per se known manner from the store 38. The pulses which drive the store 38 simultaneously drive an electrical stepping motor 45 during the formation of the rising and falling portions of workpiece profile. In response to the output pulses applied via a connection 46, the stepping motor 45 displaces the template 24 in one direction during the upward movement of the tool support means and in the opposite direction during the downward movement of the tool support means.

For switching over between the forward and return stroke displacements of the template 24, the stepping motor 45 is switched over from forward to reverse rotation. This switching over is carried out by switch means (not shown), which are associated with the stepping motor. The switch means are operated in response to switch-over pulses derived at the outputs of the respective dividers, when coincidence with the respective resetting pulse derived from the store 38 is present. Thus, such a switch-over pulse is derived from the output pulse from the divider 42 which is coincident with the resetting pulse from the store 38, to cause the switching means associated with the stepping motor 45 to be switched to inhibit the application of pulses derived during the formation of the lower dwell portion of the workpiece to the stepping motor 45, until a further switch-over pulse is applied to the switch means. Such a further switch-over pulse is derived from the divider 43 in coincidence with the last pulse preceding the upward displacement of the slidable table 14, that is the pulse coincident with the resetting pulse from the store 38. This latter switch-over pulse causes the switching means associated with the stepping motor 45 to be positioned in the "forward drive" position. Correspondingly, switch-over pulses are derived at the end of the formation of the rising portion of the workpiece profile and at the end of the formation of the "upper dwell" portion of the workpiece profile. The template is displaced via a stepdown gear, which is so arranged that it is displaced through a stroke displacement equal to the entire length of the template by exactly 72000 of the pulses applied to the stepping switch motor 45.

The stepdown between the shaft of the motor 34 and the workpiece spindle amounts to 12960:1=36×360. That means that the motor shaft needs 36 revolutions for one degree of workpiece rotation and the pulse generator 36 delivers 36×2000=72000 pulses for 1° of workpiece rotation. One recognises that, in these circumstances, the set dividing ratios of the dividers 40 to 43 correspond to the number of the degrees of angle through which the workpiece is turned while the store 38 is counted down to zero. The settings of the angular displacements of the workpiece for which the upward or downward displacement of the slidable table 14 is to be effected and for which it is to stand still are numerically equal to the respective divider ratios to which the dividers 40 to 43 are set. Thus, no converting calculations are required.

There is also provided a fifth frequency divider 50 which, for example, permits the milling of an archimedean spiral when the template is constructed as a simple triangle. According to the setting of the divider 50—which can selectably be connected in circuit in place of the dividers 40 to 43 by means of the switch 52—the spiral extends over a definite predetermined angle, for example 360° with a dividing ratio of 360 pre-set at the divider 50. Here again, the angular degrees according to their digits correspond to the setting of the dividers.

One recognises that the template is displaced that much more rapidly as the angle over which the total displacement is distributed becomes smaller. That means that the whole cam profile is accurately produced, irrespective of whether the stroke alters rapidly or slowly so long as the displacement of the template does not take place in too large steps. With a total length of template 200 millimetres, which distance is traversed in 72000 steps, the template is moved through increments of 1/36 millimetres or about 0.03 millimetres. With a step-down ratio of 10:1 of the coupling means coupling the sensing means to the tool support means and a maximum inclination of the template of 45°, this results in a tool displacement in increments of 0.003 millimetres for each step of the motor 45. Thus, the incremental displacements of the tool support means should lie below the surface irregularity of the miller. The number of the increments, though theoretically unlimited in a template, is however determined by the incremental interrogation. By choice of other numerical values, one can of course still further improve the accuracy, particularly when the workpiece is to be ground rather than milled.

In the embodiment which has been described, each of the pulses coming from the pulse generator 36 represents by virtue of its duration (or separation) an incremental angular displacement of the workpiece attached to the spindle 30; the faster the workpiece spindle 30 rotates, the higher is the pulse repetition frequency. If one were to apply this pulse sequence directly to the stepping switch motor 45, then a different master template (or a different pulse generator) would be needed for each desired angular extent; this approach, although it could be taken, would be impractical, since the equipping time would be appreciable. By means of the pulse frequency dividers 40 to 43 (one of which is co-ordinated as described to each portion of the complete curved profile to be formed), the ratio between the angle of rotation of the workpiece and the advance of the template is settably modified, since according to the division ratio set at the selected divider only each $n^{th}$ pulse is applied to the stepping switch motor 45, wherein $n$ represents the set division ratio. In order to be able to accommodate several curve portions on one and the same cam disc, a corresponding plurality of frequency dividers is provided.

In the embodiment of the invention which has been described above, electronic components are utilized to relate the displacement of the template to the angular displacement of the workpiece. However, components which do not operate electronically, for example, pneumatic, optical or hydraulic components, may be utilized for this purpose. Arrangements utilizing different means for transmitting information to correlate the displacement of the template with the angular displacement of the workpiece fall within the scope of the invention.

In one further embodiment, pneumatically operated means are coupled to the shaft of the motor 34 which are arranged to generate a predetermined number of repitious pneumatic signals on each revolution of the motor shaft. Also, hydraulically operated means may be utilized to generate the repetitious signals. Similarly, hydraulically operated means may be used to displace the master template, these means either being coupled to the repetitious signal generator via hydraulic components or being coupled via suitable transducing means to the electrical pulse generator and frequency divider devices.

In another embodiment, the repetitious signal generator comprises a light source and means responsive to light from the source to generate the repetitious signals.

I claim:
1. A shaping machine comprising, in combination:
   a frame;
   tool support means displaceably mounted on said frame;
   workpiece support means rotatably mounted on said frame;
   a master template displaceably mounted on said frame;
   first displacement means to rotatably displace said workpiece support means;
   second displacement means to displace said master template;
   sensing means for sensing the profile of said master template;
   coupling means inter-coupling said sensing means and said tool support means to impart displacement to said tool support means in response to displacement of said sensing means produced by displacement of said master template;

a repetitious signal generator coupled to said first displacement means to generate a predetermined number of repetitious signals on each predetermined angular displacement of said workpiece support means;

divider means to provide an output signal on the generation of each of a predeterminable number of said repetitious signals;

selectably operable setting means to set said divider means to determine the numerical value of said predeterminable number; and applicator means to apply said output signals to said second displacement means to control the displacement of said master template.

2. A machine as defined in claim 1, wherein said repetitious signal generator comprises an electrical pulse generator and said divider means comprises at least one frequency divider device providing a plurality of electrical output pulses corresponding to the number of pulses applied to the input of the device divided by a selectively settable divider ratio.

3. A machine as defined in claim 2, wherein said second displacement means comprises an electrical stepping motor responsive to each of said output pulses applied thereto to impart a predetermined incremental displacement to said master template.

4. A machine as defined in claim 3, wherein said divider means comprises a plurality of said frequency divider devices, each selectively settable to provide a plurality of said output pulses corresponding to a respective set divider ratio, means to store said output pulses, and means to provide control signals in dependence on the state of said storage means, said control signals being arranged to selectively connect each of said divider devices successively between the output of said pulse generator and the input of said storage means.

5. A machine as defined in claim 4, wherein the number of pulses generated by said pulse generator for each predetermined angular displacement of said workpiece support means, the number of said output pulses applied to said stepping motor to cause a predetermined displacement of said master template relative to said sensing means, and the storage capacity of said storage means are so arranged that said divider ratio presettable on said frequency divider device selected by said first mentioned control signals is numerically equal in angular degrees to the angular displacement of said workpiece support means corresponding to said predetermined displacement of said master template.

6. A machine as defined in claim 5, wherein said predetermined displacement of said master template corresponds to a complete cyclical reciprocal displacement thereof, and the sum of said divider ratios presettable on the respective ones of said plurality of frequency divider devices is numerically equal to 360 angular degrees.

7. A machine as defined in claim 4, wherein said storage means comprises a ring counter.

* * * * *